(12) United States Patent
Kim et al.

(10) Patent No.: US 9,958,557 B2
(45) Date of Patent: May 1, 2018

(54) PHOTON COUNTING APPARATUS AND METHOD, AND RADIOGRAPHIC IMAGING APPARATUS COMPRISING THE SAME

(71) Applicant: SAMSUNG ELECTRONICS CO., LTD., Suwon-si (KR)

(72) Inventors: Jin-myoung Kim, Hwaseong-si (KR); Kang-ho Lee, Osan-si (KR); Chae-hun Lee, Hwaseong-si (KR); Jae-chul Park, Yangju-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days. days.

(21) Appl. No.: 14/947,666

(22) Filed: Nov. 20, 2015

(65) Prior Publication Data

US 2016/0146952 A1 May 26, 2016

(30) Foreign Application Priority Data

Nov. 20, 2014 (KR) ........................ 10-2014-0162953

(51) Int. Cl.
*G01T 1/24* (2006.01)
*G01T 1/17* (2006.01)

(52) U.S. Cl.
CPC ................ *G01T 1/247* (2013.01); *G01T 1/17* (2013.01)

(58) Field of Classification Search
None
See application file for complete search history.

(56) References Cited

U.S. PATENT DOCUMENTS

| | | | |
|---|---|---|---|
| 5,300,930 A * | 4/1994 | Burger | ................ H03K 21/403 341/50 |
| 7,479,639 B1 * | 1/2009 | Shahar | ...................... G01T 1/17 250/370.06 |
| 7,479,916 B1 | 1/2009 | Reshef et al. | |
| 2012/0280131 A1 * | 11/2012 | Spartiotis | ................ G01T 1/247 250/366 |
| 2014/0332671 A1 | 11/2014 | Lee et al. | |

FOREIGN PATENT DOCUMENTS

KR    10-2014-0132829 A    11/2014

* cited by examiner

*Primary Examiner* — Edwin Gunberg
(74) *Attorney, Agent, or Firm* — Sughrue Mion, PLLC

(57) ABSTRACT

Provided are photon counting apparatuses and methods, and radiographic imaging apparatuses configured to receive charge signals corresponding to incident radiation photons, and to count the incident radiation photons by using a plurality of counting bits, such that the counting changes only one counting bit from among the plurality of counting bits when the count value is increased by one. By using the photon counting methods, a data-change frequency of photon counting data corresponding to radiation photons is minimized while counting the radiation photons based on charge signals corresponding to input radiation photons.

16 Claims, 9 Drawing Sheets

FIG. 2

| Num | Binary Code | Gray Code |
|---|---|---|
| 0 | 0 0 0 0 ⎫ 1 | 0 0 0 0 ⎫ 1 |
| 1 | 0 0 0 1 ⎫ 2 | 0 0 0 1 ⎫ 1 |
| 2 | 0 0 1 0 ⎫ 1 | 0 0 1 1 ⎫ 1 |
| 3 | 0 0 1 1 ⎫ 3 | 0 0 1 0 ⎫ 1 |
| 4 | 0 1 0 0 ⎫ 1 | 0 1 1 0 ⎫ 1 |
| 5 | 0 1 0 1 ⎫ 2 | 0 1 1 1 ⎫ 1 |
| 6 | 0 1 1 0 ⎫ 1 | 0 1 0 1 ⎫ 1 |
| 7 | 0 1 1 1 ⎫ 4 | 0 1 0 0 ⎫ 1 |
| 8 | 1 0 0 0 ⎫ 1 | 1 1 0 0 ⎫ 1 |
| 9 | 1 0 0 1 ⎫ 2 | 1 1 0 1 ⎫ 1 |
| 10 | 1 0 1 0 ⎫ 1 | 1 1 1 1 ⎫ 1 |
| 11 | 1 0 1 1 ⎫ 3 | 1 1 1 0 ⎫ 1 |
| 12 | 1 1 0 0 ⎫ 1 | 1 0 1 0 ⎫ 1 |
| 13 | 1 1 0 1 ⎫ 2 | 1 0 1 1 ⎫ 1 |
| 14 | 1 1 1 0 ⎫ 1 | 1 0 0 1 ⎫ 1 |
| 15 | 1 1 1 1 | 1 0 0 0 |
| Total Transition | 26 | 15 |

PHOTON COUNTING APPARATUS AND METHOD, AND RADIOGRAPHIC IMAGING APPARATUS COMPRISING THE SAME

CROSS-REFERENCE TO RELATED APPLICATIONS

This application claims priority from Korean Patent Application No. 10-2014-0162953, filed on Nov. 20, 2014, in the Korean Intellectual Property Office, the disclosure of which is incorporated herein by reference in its entirety.

BACKGROUND

1. Field

One or more exemplary embodiments of the present disclosure relate to photon counting apparatuses and methods, and radiographic imaging apparatuses comprising the same.

2. Description of the Related Art

A radiographic imaging apparatus is an imaging system for obtaining images of an inside of an object, such as a human body or an article, by irradiating the object with radiation such as an X-ray. Such a radiographic imaging apparatus includes a radiation detector configured to detect the radiation irradiated to the object.

The radiographic imaging apparatus may include a photon counting apparatus that uses a photon counting detection (PCD) method of counting radiation photons incident to the radiation detector. For example, a photon-counting type X-ray detector includes a photoelectric conversion material unit configured to convert input X-ray photons into electric charges, and a readout circuit unit configured to count the electric charges converted by the photoelectric conversion material unit. Electric charge packets generated in the photoelectric conversion material unit reach an input end of the readout circuit unit due to an internal potential difference. After reaching the input end of the readout circuit unit, the charges are voltage-amplified in an amplifier, and are counted according to size in an internal comparator and counter after passing through an additional amplifying or shaping process.

By using an asynchronous ripple binary counter, the readout circuit unit increases data by a count value of one each time a photon is incident to the radiation detector, and finally reads a data value at a point in time when X-ray photons are incident and reconstructs the data value to form an image.

SUMMARY

Since electrical noise generated from a digital counter may affect an analog amplifier due to the simultaneous occurrence of photons being incident to a readout circuit unit and the operation of the counter, conventional photon-counting type radiation detectors have a possibility of malfunction. Therefore, one or more exemplary embodiments provide photon counting methods that are capable of reducing electrical power noise in the digital counter, apparatuses thereof, and a radiographic imaging apparatus comprising the same. However, technical problems to be solved are not limited thereto, and other technical problems may exist.

Additional aspects will be set forth in part in the description which follows and, in part, will be apparent from the description, or may be learned by practice of the presented exemplary embodiments.

According to one or more exemplary embodiments, a photon counting method includes receiving charge signals corresponding to input radiation photons; and counting the radiation photons based on the charge signals, in which the counting converts one bit from among bit strings of photon counting data when a count value corresponding to the radiation photons increases by "1".

The counting may count using a Gray code.

The counting may further include voltage converting of the charge signals into voltage signals; and comparing of voltages of the voltage signals with reference voltages and outputting of the a result of the comparing. The photon counting data may represent a count value at a point in time when an incidence of the radiation photons is completed by increasing the count value by one every time a radiation photon is incident, in which the radiation photons are input based on the output result of the comparing.

The output result of the comparing is information about determining whether or not the voltages of the voltage signals converted in the voltage converting reaches at least one of the reference voltages, and the photon counting data may be counted according to at least one of the reference voltages.

The voltage converting may include charging a capacitor by the charge signals; and amplifying of a voltage applied to both ends of the capacitor.

The method of photon counting according to an exemplary embodiment may further include generating a feedback control signal based on the output result of the comparing, and the voltage converting may further include resetting of the voltage applied to the capacitor in response to the feedback control signal.

The method of photon counting according to an exemplary embodiment may further include shaping of the voltage signals converted in the voltage converting.

According to one or more exemplary embodiments, a photon counting apparatus includes a readout circuit unit counting radiation photons based on charge signals corresponding to the radiation photons and outputting photon counting data, in which the readout circuit unit includes a counting unit converting one bit from among bit strings of the photon counting data when a count value corresponding to the radiation photons increases by "1".

The counting unit may count the radiation photons by using a Gray code.

The photon counting apparatus according to an exemplary embodiment may further include a photoelectric converter absorbing the radiation photons and converting the absorbed radiation photons into the charge signals.

The readout circuit unit may further include a voltage converter converting the input charge signals into voltage signals; and a comparison unit comparing voltages of the voltage signals converted by the voltage converter with at least one reference voltage and outputting the result of the comparing. The counting unit may increase the count value by one every time a radiation photon is incident, in which the radiation photons are input based on the result of the comparing output from the comparison unit, and may output a count value, as photon counting data, at a point in time when incidence of the radiation photons is completed.

The result of the comparing output from the comparison unit is information about determining whether or not the voltages of the voltage signals converted by the voltage converter reach at least one of the reference voltages, and the photon counting data may be counted according to at least one of the reference voltages.

The voltage converter may include a capacitor being charged by the input charge signals and converting the input charge signals into the voltage signals; and an amplifier connected to the capacitor.

The voltage converter may further include a feedback resistor connected to both ends of the capacitor.

The readout circuit unit may further include a feedback switch control circuit unit generating a feedback control signal based on the result of the comparing output from the comparison unit, and the voltage converter may further include a switch to reset a voltage applied to the capacitor in response to the feedback control signal generated by the feedback switch circuit unit.

The photon counting apparatus according to an exemplary embodiment may further include a shaper shaping voltage signals converted by the voltage converter.

According to one or more exemplary embodiments, a radiation imaging apparatus includes the photon counting apparatus described above; and an image processor performing image processing on a detection signal detected from the photon counting apparatus. The photon counting apparatus may include a readout circuit unit outputting photon counting data by counting radiation photons based on charge signals corresponding to the radiation photons, and the readout circuit unit may include a counting unit converting one bit from among bit strings of the photon counting data when a count value corresponding to the radiation photons increases by "1".

BRIEF DESCRIPTION OF THE DRAWINGS

These and/or other aspects of the exemplary embodiments will become apparent and more readily appreciated from the following description of the exemplary embodiments, taken in conjunction with the accompanying drawings in which:

FIG. 2 is a chart comparing converted numbers of image information according to a photon counting method of an exemplary embodiment with converted numbers of image information according to a photon counting method of a comparative example;

DETAILED DESCRIPTION

Figure 1:
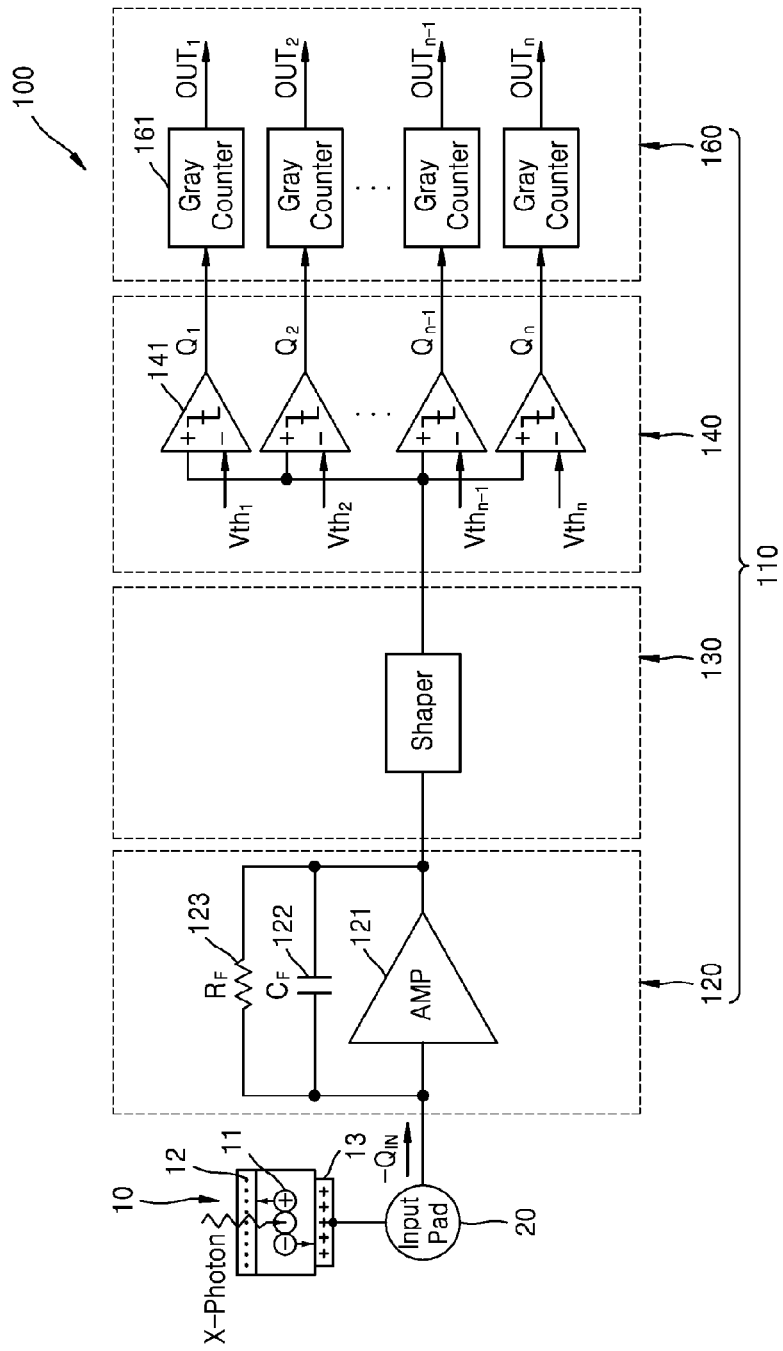
FIG. 1 is a schematic block diagram illustrating a photon counting apparatus, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Advantages and features of one or more exemplary embodiments and methods of accomplishing the same may be understood more readily by reference to the following detailed description of the exemplary embodiments and the accompanying drawings. In this regard, the present exemplary embodiments may have different forms and should not be construed as being limited to the descriptions set forth herein. Rather, these exemplary embodiments are provided so that this disclosure will be thorough and complete and will fully convey the concept of the present exemplary embodiments to one of ordinary skill in the art, and the inventive concept will only be defined by the appended claims. Like reference numerals refer to like elements throughout the specification. In the drawings, the sizes or the thicknesses of layers and regions are exaggerated for clarity.

Hereinafter, the terms used in the specification will now be briefly defined, and the exemplary embodiments will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

When a part "includes" or "comprises" an element, unless there is a particular description contrary thereto, the part can further include other elements, not excluding the other elements.

FIG. 1 is a schematic block diagram illustrating a photon counting apparatus, according to an exemplary embodiment.

Referring to FIG. 1, the photon counting apparatus 100 includes a readout circuit unit 110 configured to count radiation photons based on a signal input from a photoelectric converter 10.

The photoelectric converter 10 receives incident radiation photons from outside and generates a charge signal $-Q_{IN}$ corresponding to the received radiation photons. The charge signal $-Q_{IN}$ generated from the photoelectric converter 10 may be an electric charge packet. The photoelectric converter 10 may include a photoelectric conversion material unit 11. The photoelectric conversion material unit 11 may include a photoconductor material having a characteristic of generating charges in response to radiation. The photoelectric conversion material unit 11 may include a variety of photoconductor materials. For example, the photoconductor material may include a photoelectric conversion material such as amorphous selenium or $HgI_2$ with respect to an X-ray. Furthermore, the photoelectric converter 10 may include an upper electrode 12 and a pixel electrode 13, by which the charges generated in the photoelectric conversion material unit 11 are output. A voltage is applied to the upper electrode 12 in order to form an electric field. When radiation is irradiated to the photoelectric conversion material unit 11, electron-hole pairs are generated in the photoelectric conversion material unit 11, and the electron-hole pairs are separated in a state of applying a voltage to the upper electrode 12. Furthermore, the separated electrons and holes are called charges. The charges generated in the photoelectric conversion material unit 11 proceed to an input pad 20 via the pixel electrode 13. As will be described below, the photon counting apparatus 100 may be a flat-type panel capable of detecting an image. A plurality of pixel electrodes 13 may be arranged two-dimensionally, and may generate a charge signal $-Q_{IN}$ corresponding to radiation incident to each of the pixel electrodes 13. The upper electrode 12 may be a common electrode to each of the pixel electrodes 13. The upper electrode 12 and the pixel electrode 13 are examples of an electrode structure for outputting charges generated in the photoelectric conversion material unit 11, but the exemplary embodiments are not limited thereto.

The readout circuit unit 110 counts the radiation photons incident to the photoelectric converter 10 by receiving the charge signal $-Q_{IN}$ generated in the photoelectric converter 10 as an input signal, and outputs a result signal corresponding to the result of the counting. In detail, the readout circuit unit 110 may include a voltage converter 120, a comparison unit 140, and a counting unit 160.

The voltage converter 120 amplifies the charge signal $-Q_{IN}$ input from the photoelectric converter 10 when converting the charge signal $-Q_{IN}$ so as to read a voltage. The voltage converter 120 may include an amplifier 121, and a capacitor 122 connected in parallel to the amplifier 121. An operational amplifier ("op-amp") may be adopted as the amplifier 121. The operational amplifier includes two input terminals and an output terminal. The amplifier 121 may be connected to the capacitor 122 via negative feedback. In other words, an inverted input terminal (−) and the output terminal of the amplifier 121 are respectively connected to each end of the capacitor 122. One end of the capacitor 122 and the inverted input terminal (−) of the amplifier 121 are also connected to the input pad 20. As an input resistance of the amplifier 121 is significantly large or substantially infinite, the charge signal $-Q_{IN}$ (i.e., a charge packet) input from the input pad 20 flows not to the inverted input terminal (−) of the amplifier 121 but to the capacitor 122. As the capacitor 122 charges, voltages V that are proportional to amounts of the input charges are applied to both ends of the capacitor 122. Furthermore, the voltage converter 120 may further include a feedback resistor 123 connected to both ends of the capacitor 122. The feedback resistor 123 removes the charges input to the capacitor 122 so that the amplifier 121 may receive the following charge signal $-Q_{IN}$.

The comparison unit 140 compares voltage signals converted by the voltage converter 120 with at least one critical energy level and discriminates whether the converted voltage signals are larger or smaller than the at least one critical energy level. The comparison unit 140 then outputs a signal according to the result of the discrimination.

According to an exemplary embodiment, the comparison unit 140 may include a plurality of comparators 141 corresponding to a plurality of reference voltages $V_{th1}$, $V_{th2}$ ..., and $V_{thN}$. Each of the comparators 141 may compare voltages of the voltage signals converted by the voltage converter 120 with the reference voltages $V_{th1}$, $V_{th2}$ ..., and $V_{thN}$ corresponding to the critical energy levels, and may discriminate respectively whether the voltages of the voltage signals are larger or smaller than the reference voltages $V_{th1}$, $V_{th2}$ ..., and $V_{thN}$. The reference voltages $V_{th1}$, $V_{th2}$ ..., and $V_{thN}$ that are used for comparison in the comparators 141 may be defined in advance by a user or a system designer. In addition, the reference voltages $V_{th1}$, $V_{th2}$ ..., and $V_{thN}$ may be determined according to system settings. Furthermore, the reference voltages $V_{th1}$, $V_{th2}$ ..., and $V_{thN}$ may be changed by a user or a system as needed.

The readout circuit unit 110 may further include a database storing at least one of the critical energy levels or the reference voltages. Thus, the comparison unit 140 may inspect the above database and determine a certain reference voltage or critical energy level according to a selection of the user or the system settings from the database, and afterwards, may further compare the called critical energy level with the voltage signals converted by the voltage converter 120.

According to an exemplary embodiment, the comparison unit 140 may output a discrimination result between the converted voltage signals and the critical energy levels. For example, in the case of discrimination between a reference voltage and a voltage of an electrical signal, if the voltage of the electrical signal is equal to or larger than the reference voltage, the comparison unit 140 may output a signal of "1". Meanwhile, if the voltage of the electrical signal is smaller than the reference voltage, the comparison unit 140 may output a signal of "0". Signals $Q_1, Q_2$ ... and $Q_n$, such as binary signals output from the comparison unit 140 and corresponding to a result of the discrimination, are transmitted to the counting unit 160.

A voltage shaper 130 may further be disposed between the voltage converter 120 and the comparison unit 140. The voltage shaper 130 may prevent an operation error of the comparators 141 by smoothing waveforms of the voltage signals output from the voltage converter 120.

The counting unit 160 may include a plurality of counters 161 that count photons having an energy equal to or larger than the critical energy levels corresponding to each of the signals $Q_1, Q_2$ ..., and $Q_n$ transmitted from the comparison unit 140. The counting unit 160 may further output result signals with respect to the photon counting, that is, several pieces of photon counting data $OUT_1, OUT_2$ ..., and $OUT_n$. In a radiographic imaging apparatus, the photon counting data $OUT_1, OUT_2$ ..., and $OUT_n$, which are the result signals with respect to the photon counting, may be used to measure a radiation strength according to respective energy bands. According to another exemplary embodiment, the counting unit 160 may count the number of photons larger than the critical energy levels by counting only the signal of "1" output from the comparison unit 140.

The counters 161 convert only one bit from among bit strings of the photon counting data when a count value corresponding to the radiation photons increases by "1". In other words, the counters 161 count the photons by using a method in which the amount of an instantaneous maximum change becomes "1". Here, when the count value is stored as N-bit, the amount of the instantaneous maximum change means a maximum number of bits being changed when the data is changed. N is the number of forming bit strings and may be a natural number such as 4, 8, and 16. For example, when the signal of "1" is input from the comparison unit 140 to the counters 161, the counters 161 update the photon counting data counted by using a method in which only one bit from among the N bits forming a count value stored in a buffer is converted from 0 to 1 or from 1 to 0 and remaining N−1 bits are maintained, and outputs a count value at a point in time when an incidence of the radiation photons is completed as the photon counting data.

A Gray code method or variations thereof are methods of displaying values. The counters 161 according to the present exemplary embodiment may be Gray counters counting the radiation photons by using a Gray code, or a counter having logic similar to that of the Gray code.

FIG. 2 is a chart comparing converted numbers of image information according to a photon counting method of an exemplary embodiment with converted numbers of image information according to a photon counting method of a comparative example. As an example, 4 bits are given as count values. Referring to FIG. 2, if the count values are displayed using a Gray code by counting photons having an energy equal to or larger than critical energy levels according to each of the counters 161 of the counting unit 160, it can be seen that only one bit is changed from among the bit strings when the count values increase by one. That is, when the count values are displayed using a Gray code, the number of bits changed while the count values and are converted from 0 to 15 becomes 15 in total. Meanwhile, if the count values are displayed using a binary code in the same manner as the comparative example, the number of bits to be converted becomes 1 to 4 when the count values increase by one. In the case of a binary code of 4 bits, the binary code is converted into 0001 when a count value of 0000 increases by "1", and thus, the number of bits to be converted from among the bit strings is 1. However, the binary code is converted into 1000 when a count value 0111 increases by "1", and thus, the number of bits to be converted from among the bit strings is 4. Therefore, in the binary code of 4 bits, the number of bits changed while the count values are converted from 0 to 15 becomes 26 in total. By comparing methods of the binary code of 4 bits with the Gray code of 4 bits, a conversion frequency of photon counting data is 26:15. Thus, the conversion frequency may be lower when the Gray code is used.

FIG. 2 illustrates a case when the count values are 4 bits, and the conversion frequency of photon counting data in an N-bit binary counter counting using the binary code method by generalize the case is represented by Formula 1 as follows:

$$\sum_{k=1}^{n} k \cdot 2^{n-k}$$ [Formula 1]

Meanwhile, the conversion frequency of photon counting data in an N-bit binary counter counting by the Gray code method is represented by Formula 2 as follows:

$$2^n - 1$$ [Formula 2]

By calculating using a 16 bit counter averagely adopted in a mammography apparatus, in the case of calculating using a binary counter of the comparative example, the maximum amount of an instantaneous change is 16, and thus, the number of bits being changed in total reaches 131054. Whereas, in the case of calculating using the counters 161 according to the present exemplary embodiment, the maximum amount of an instantaneous change is 1, and thus, the number of bits being changed in total is limited to 65536.

The counting unit 160 changes the count values, that is, data states in a process of counting the radiation photons. A temporary transient current is generated in a digital power source/ground in order to change the data states, and the current causes a power source noise. There is a possibility that power source noise/ground noise is transmitted to an analog portion by capacitive coupling or through a ground substrate, and there is also a possibility of a malfunction occurring.

As a bit depth increases in Formula 1 and 2, a probability of a simultaneous change of states of the photon counting data in the counters also increases. Counters of the comparative example have a relatively high data-change frequency of the photon counting data compared to the counters 161 of the photon counting apparatus 100 according to the present exemplary embodiment. The photon counting apparatus 100 according to the present exemplary embodiment minimizes the data-change frequency of the photon counting data when using the photon counting data in the counting unit 160 and limits current flow in order to stabilize a power source noise of the digital power source. Thus, a noise characteristic may be strengthened and a performance may be stabilized, entirely.

Photon counting result signals $OUT_1$, $OUT_2$ . . . , and $OUT_n$ according to the counting unit 160 may be output to an outside through an output pad of the readout circuit unit 110. As illustrated in FIG. 1, the result signals $OUT_1$, $OUT_2$ . . . , and $OUT_n$ output from the readout circuit unit 110 may be transmitted to, e.g., an image processor 600 (of FIG. 5) described below, etc. The image processor 600 may generate an image in a predetermined critical energy level according to the number of photons having energy levels equal to or larger than the critical energy levels.

Figure 3:
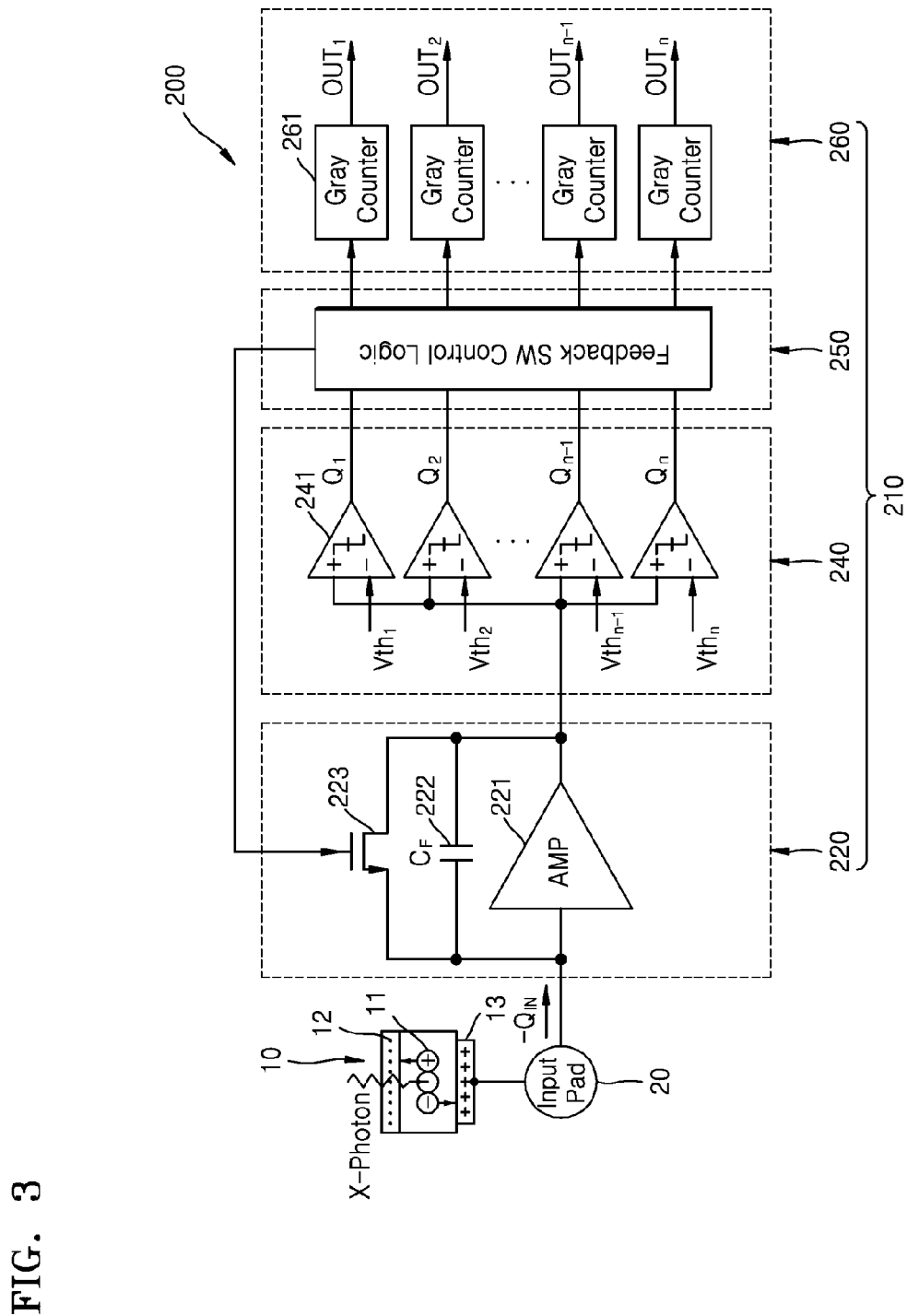
FIG. 3 is a schematic block diagram illustrating a photon counting apparatus, according to another exemplary embodiment.

FIG. 3 is a schematic block diagram illustrating a photon counting apparatus 200, according to another exemplary embodiment.

Referring to FIG. 3, a readout circuit unit 210 of the photon counting apparatus 200 may include a voltage converter 220, a comparison unit 240, a feedback switch control circuit unit 250, and a counting unit 260.

The voltage converter 220 amplifies a charge signal $-Q_{IN}$ input from a photoelectric converter 10 while converting the charge signal $-Q_{IN}$ so as to read a voltage. The voltage converter 220 may include an amplifier 221, a capacitor 222 connected to the amplifier 221 in parallel, and a switch 223 forcibly resetting the capacitor 222. An operational amplifier may be adopted as the amplifier 221. The amplifier 221 may be connected to the capacitor 222 via negative feedback. One end of the capacitor 222 and an inverted input terminal (−) of the amplifier 221 are connected to the input pad 20. As an input resistance of the amplifier 221 is significantly large or substantially infinite, the charge signal $-Q_{IN}$ (i.e., a charge packet) input from the input pad 20 flows not to the inverted input terminal (−) of the amplifier 221 but to the capacitor 122. As the capacitor 222 is charged, voltages V that are proportional to amounts of the input charges are applied to both ends of the capacitor 222. Furthermore, a switch 223 connected to the capacitor 222 may be formed of, e.g., a metal-oxide semiconductor (MOS) transistor. The switch 223 forcibly resets the voltages V applied to the capacitor 222 by receiving a feedback control signal from the feedback switch control circuit unit 250 described below.

The comparison unit 240 may include a plurality of comparators 241 corresponding to a plurality of reference voltages $V_{th1}$, $V_{th2}$ . . . , and $V_{thN}$. Each of the comparators 241 compares voltages of the voltage signals converted by the voltage converter 220 with the reference voltages $V_{th1}$, $V_{th2}$ . . . , and $V_{thN}$ corresponding to a plurality of critical energy levels, discriminates respectively whether the voltages of the voltage signals are larger or smaller than the reference voltages $V_{th1}$, $V_{th2}$ . . . , and $V_{thN}$, and transmits signals $Q_1$, $Q_2$ . . . , and $Q_n$ with respect to a result of the discrimination to the counting unit 260.

The feedback switch control circuit unit 250 may be disposed between the comparison unit 240 and the counting unit 260. The feedback switch control circuit unit 250 generates feedback signals from the signals $Q_1, Q_2 \ldots$, and $Q_n$ with respect to a result of the discrimination, which is transmitted from the comparators 241 so as to operate the switch 223 of the voltage converter 220 at a point in time when an incidence of the radiation photons to the photoelectric converter 10 is completed, and transmits the feedback signals to the switch 223.

The counting unit 260 may include a plurality of counters 261, which count photons having an energy equal to or larger than critical energy levels corresponding to each of the signals $Q_1, Q_2 \ldots$, and $Q_n$ transmitted from the comparison unit 240, and output result signals with respect to the photon counting, that is, several pieces of photon counting data $OUT_1, OUT_2 \ldots$, and $OUT_n$. The counters 261 may be Gray counters converting one bit from among bit strings of the photon counting data when a count value corresponding to the radiation photons increases by "1", or may be a counter having logic similar to that of the Gray code.

A radiographic imaging apparatus will now be described by referring to FIGS. 4 to 8.

Figure 4:
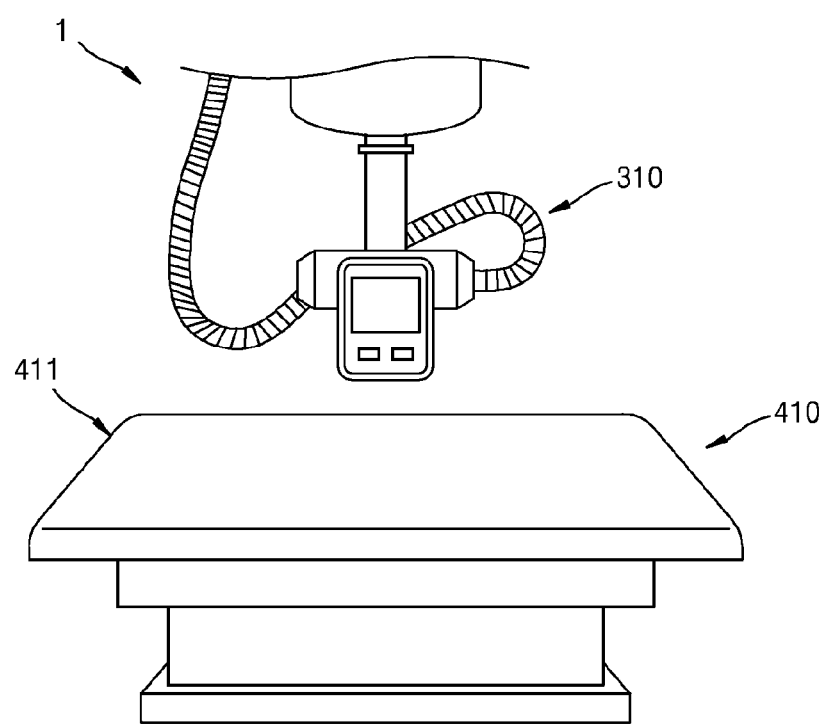
FIG. 4 is a configuration diagram illustrating a radiographic imaging apparatus, according to an exemplary embodiment.

FIG. 4 is a configuration diagram illustrating a radiographic imaging apparatus 1, according to an exemplary embodiment. Referring to FIG. 4, the radiographic imaging apparatus 1 may include a radiation irradiation module 310 and a stationary unit 410 including a stationary stand 411 on which an object is placed. For convenience of explanation, the radiographic imaging apparatus will be described as having a configuration illustrated in FIG. 5 as an example, but the radiographic imaging apparatus is not limited thereto. The configuration may be applied identically to other radiographic imaging apparatuses generating an image by counting the number of radiation photons, such as a fluoroscopy image apparatus, an electrocardiogram measuring instrument, a mammography apparatus, or a computed tomography apparatus.

Figure 5:
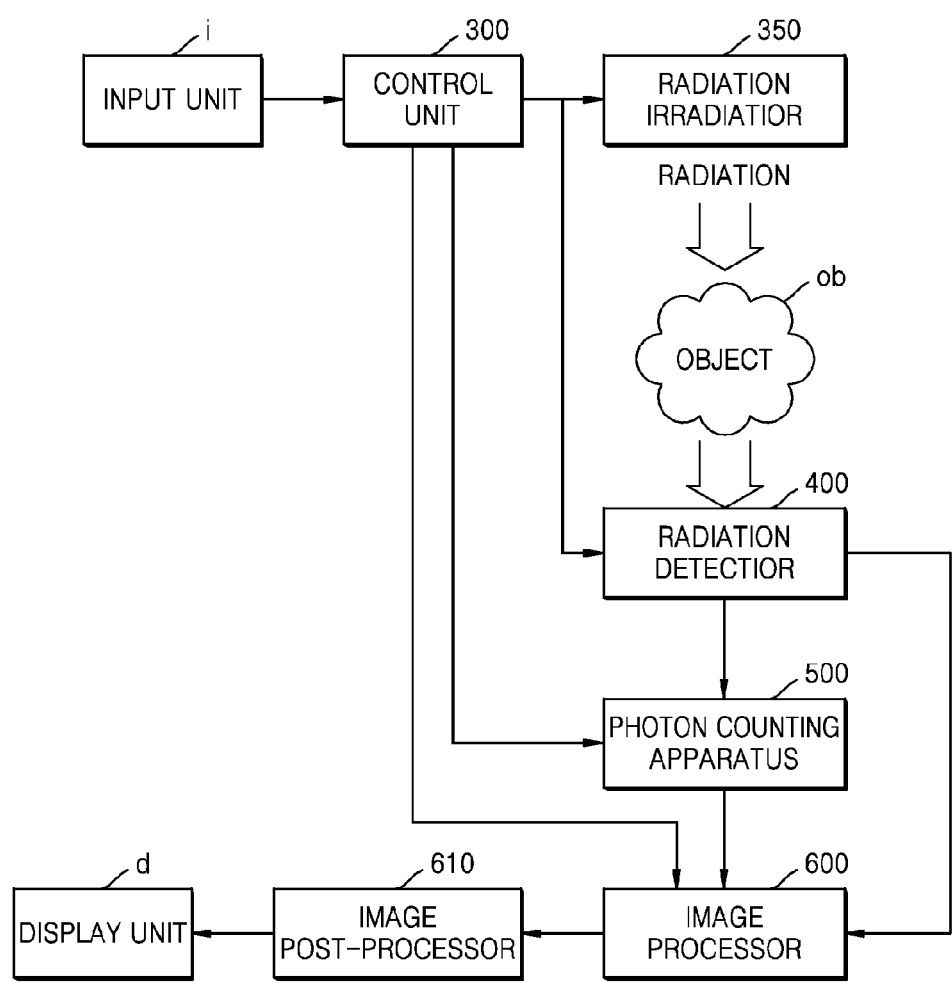
FIG. 5 is a configuration diagram of the radiographic imaging apparatus of FIG. 4.

FIG. 5 is a configuration diagram of the radiographic imaging apparatus 1 according to an exemplary embodiment. Referring to FIG. 5, the radiographic imaging apparatus 1 may include an input unit i, a control unit 300, a radiation irradiator 350, a radiation detector 400, a photon counting apparatus 500, an image processor 600, and a display unit d.

The input unit i receives predetermined information, instructions or commands from an operator of the radiographic imaging apparatus. In detail, the input unit i may receive various information, an instruction or a command related to radiographic imaging or radiation image processing, for example, the number of a radiation irradiation or the amount of the radiation irradiation, etc., and may transmit the received various information, instructions or commands to the control unit 300.

According to an exemplary embodiment, the input unit i may include various user interfaces installed directly in the radiographic imaging apparatus, for example, a variety of buttons, keyboards, mouses, track-balls, track-pads, or touch screen panels, or a variety of levers, handles, or joysticks. The input unit i may be directly installed in the radiographic imaging apparatus, or may be formed in a separate workstation capable of transmitting/receiving data through a wired or wireless communication network to/from the radiographic imaging apparatus.

The control unit 300 generates a predetermined control instruction and transmits the generated control instruction to the radiation irradiator 350, the radiation detector 400, the photon counting apparatus 500, or the image processor 600, and thus may control the whole operation of the radiographic imaging apparatus.

In detail, the control unit 300 receives the instruction, command or various information of a user input from the input unit i, and may control a predetermined operation of the radiographic imaging apparatus by using the transmitted instruction, command, or various information, or by a configuration defined in advance.

For example, the control unit 300 may receive a radiation imaging start instruction to start irradiating an object ob with a predetermined amount of radiation through the input unit i from the user, and the radiation irradiator 350 may irradiate the object ob with the radiation in response to the input radiation imaging start instruction.

The radiation irradiator 350 includes a radiation source emitting the radiation. The radiation source may be, for example, a radiation tube including a negative (−) electrode and an anode (a positive electrode). For example, an X-ray is an electromagnetic wave having a short wavelength which is generated by colliding an electron ray with metal, in which an electron ray is emitted from the negative electrode at high speed during vacuum discharge. The radiation source may obtain a single-energy X-ray image by emitting radiation having certain energy. As another example, the radiation source irradiates the object ob several times with radiations having a plurality of energies which are different from each other, and thus may obtain a multi-energy X-ray image (MEX). Furthermore, the radiation irradiator 350 may further include a collimator controlling an irradiation direction or an irradiation range of the radiation. The radiation irradiator 350 is disposed in the radiation irradiation module 310 of FIG. 4 and irradiates the object ob with the radiation.

The radiation detector 400 includes a photoelectric converter 10 (of FIG. 1) which receives the radiation irradiated from the radiation irradiator 350 and converts the radiation into an electrical signal. The radiation detector 400 may be formed in the stationary stand 411 of the radiation stationary unit 410 so as to receive the radiation which is irradiated from the radiation irradiator 300 and transmits the object ob. As illustrated in FIG. 5, if the radiation irradiation module 310 in which the radiation irradiator 350 is installed irradiates radiation from an upper direction, the radiation detector 400 may be installed in a lower end of the stationary stand 411 in the radiation stationary unit 410.

Figure 6:
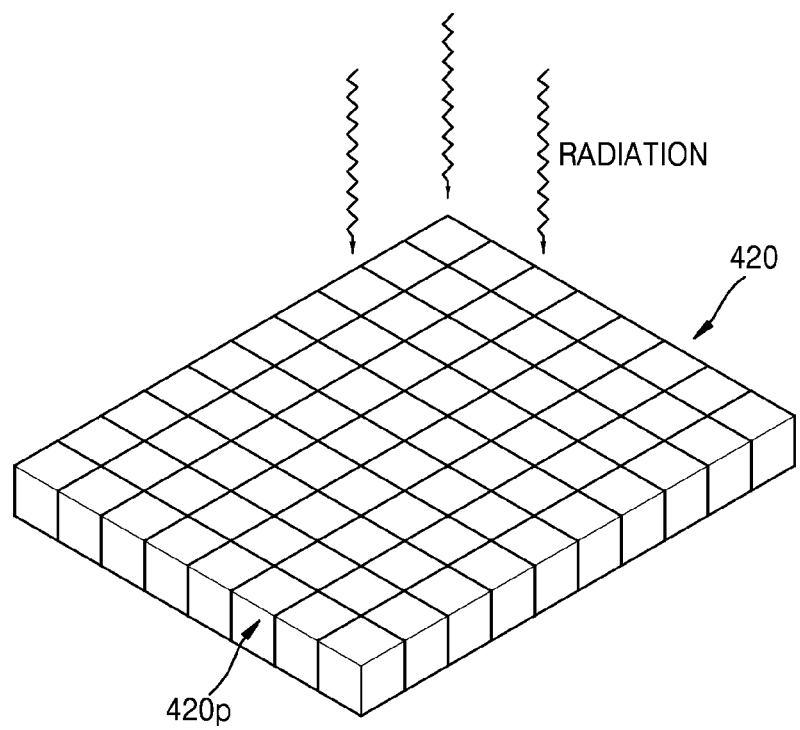
FIG. 6 is a configuration diagram illustrating an exemplary embodiment of a radiation-receiving panel.

FIG. 6 is a schematic view of a pixel array structure 420 of the radiation detector 400, according to an exemplary embodiment. Referring to FIG. 6, the radiation detector 400 is a flat-panel type detector and may be separated by at least one pixel 420p. Each of the pixels 420p in the radiation detector 400 may be a photoelectric converter 10 (of FIG. 1) which, when radiation reaches each of the pixels 420p, generates an electrical signal corresponding to the radiation and converts the electrical signal into a radiation signal corresponding to the received radiation. According to another exemplary embodiment, when radiation reaches each of the pixels 420p, each of the pixels 420p outputs visible light photons corresponding to the reached radiation, senses the visible light photons, generates electrical signals corresponding to the sensed visible light photons, and converts the electrical signals into radiation signals corresponding to the radiation.

Figure 7:
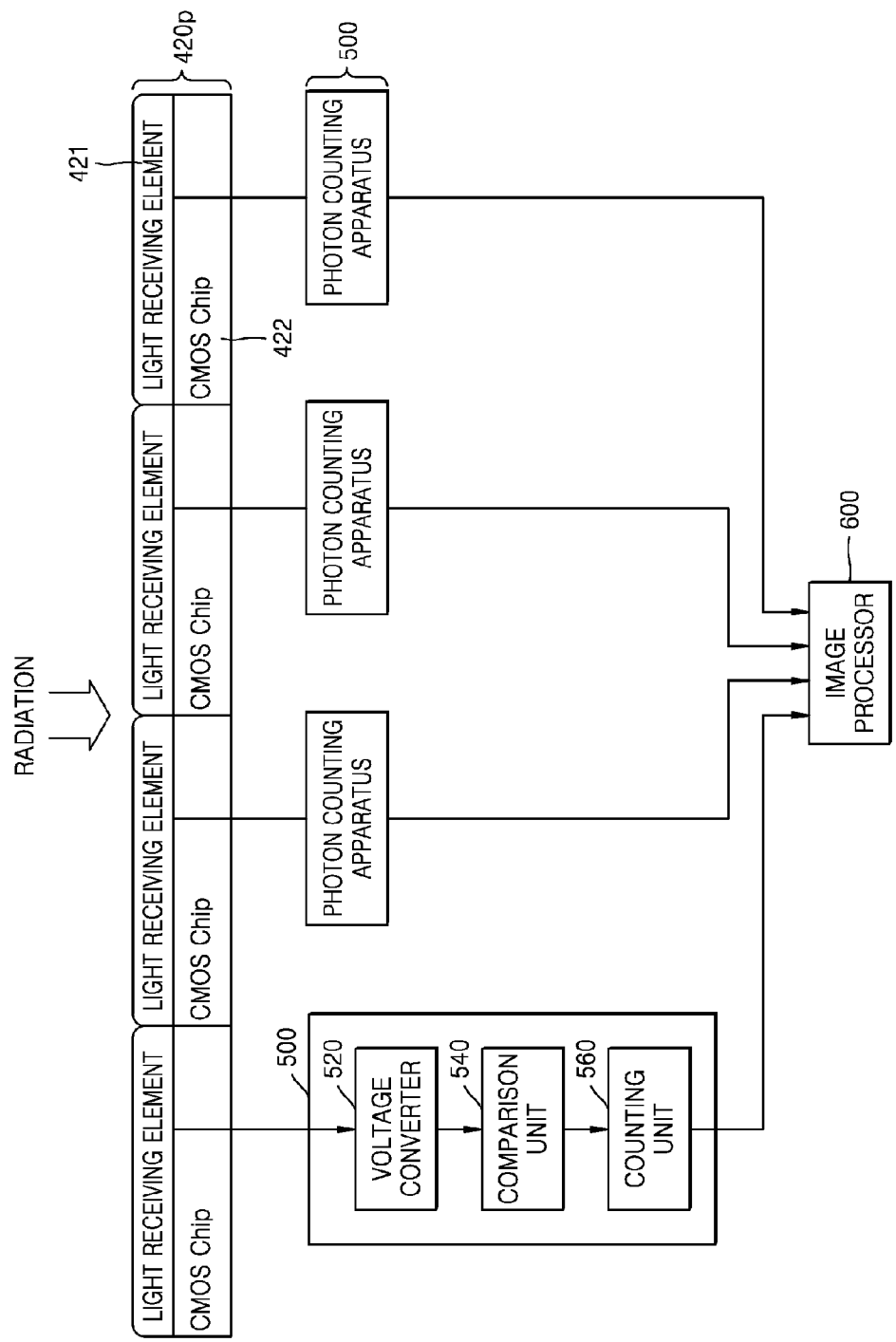
FIG. 7 is a configuration diagram illustrating an exemplary embodiment of a radiation-receiving panel and a photon counting apparatus.

FIG. 7 is a configuration diagram illustrating each pixel of a radiation detector 400 and a photon counting apparatus 500 according to an exemplary embodiment.

Referring to FIG. 7, each of the pixels 420p may include light receiving elements 421, and complementary metal-oxide semiconductor (CMOS) chips 422 in which the light receiving elements 421 may be installed. The light receiving elements 421 may convert radiation received by a direct method into a predetermined electrical signal, that is, a charge signal. The light receiving elements 421 may correspond to the photoelectric converter 10 (of FIG. 1). According to the received radiation, the light receiving elements 421 may output a predetermined electrical signal corresponding to the radiation, that is, a charge signal. The charge signal output from the light receiving elements 421 may be transmitted directly to the photon counting apparatus 500. The output charge signal may be an electric charge packet. Furthermore, the electric charge packet may be an electric charge packet formed of a negative charge.

The radiation detector 400 may be connected electrically to the photon counting apparatus 500. The photon counting apparatus 500 may count photons having an energy equal to or larger than critical energy levels and may obtain predetermined data required to generate a radiation image, for example, information about a radiation strength.

The photon counting apparatus 500 may include a voltage converter 520, a comparison unit 540, and a counting unit 560. The photon counting apparatus 500 may be the photon counting apparatus 100 or the photon counting apparatus 200 described with respect to FIGS. 1 and 3.

Figure 8:
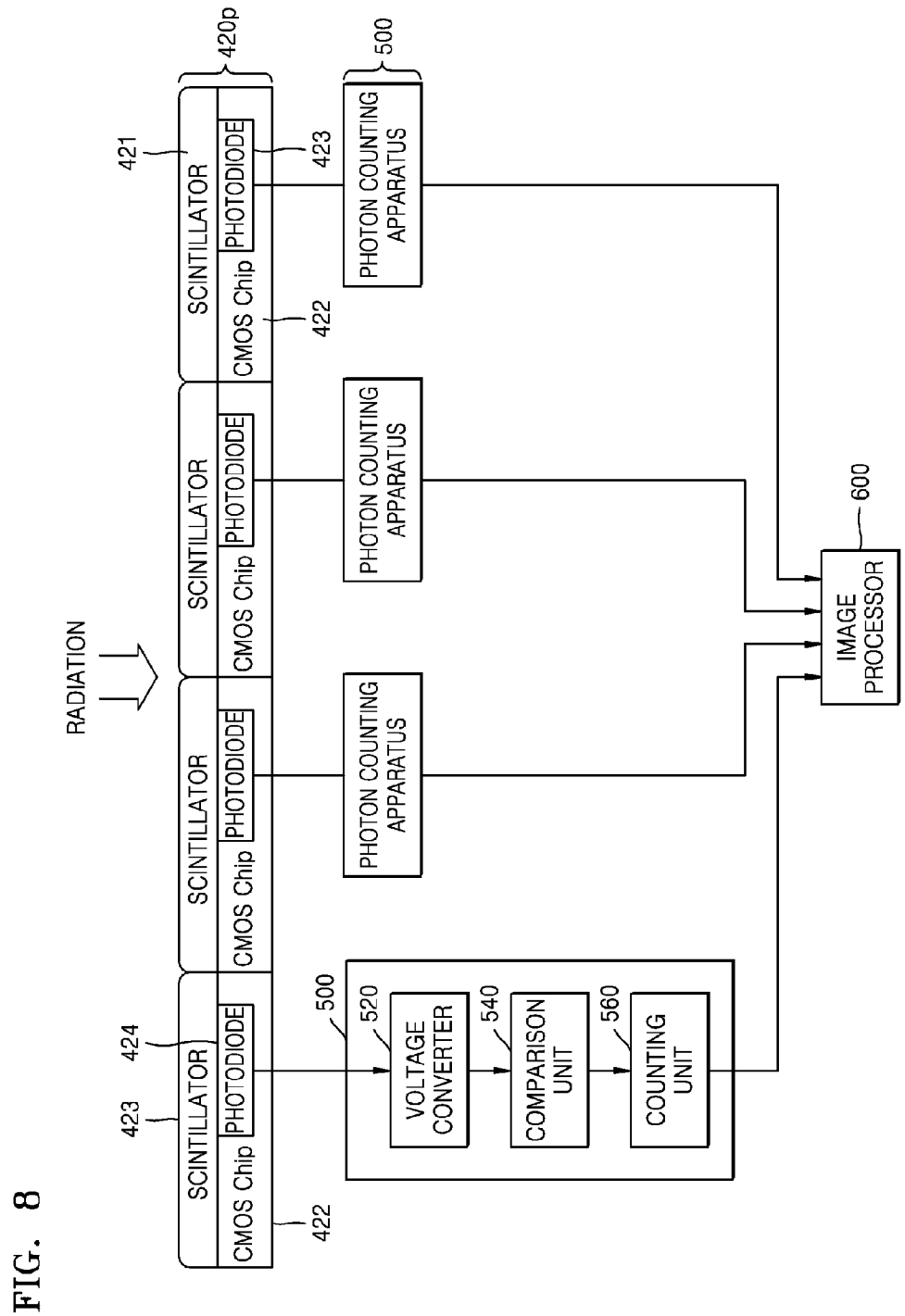
FIG. 8 is a configuration diagram illustrating an exemplary embodiment of a radiation-receiving panel and a photon counting apparatus.

FIG. 8 is a configuration diagram illustrating each pixel of the radiation detector 400 and the photon counting apparatus 500 according to another exemplary embodiment.

Referring to FIG. 8, each of the pixels 420*p* may include scintillators 423, photoelectric elements 424, and CMOS chips 422 in which the photoelectric elements 424 are installed. The scintillators 423 are an element which receives radiation and outputs a predetermined photon, for example, a visible photon, according to the received radiation. The photoelectric elements 424 may sense visible light photons output from the scintillators 423 and may output an electrical signal, that is, a radiation signal. As an example, the photoelectric elements 424 may be a photodiode. The radiation signal output from the photoelectric elements 424 may be an electric charge packet. Furthermore, the electric charge packet may be formed of a negative charge. As described above, the photon counting apparatus 500 counts the transmitted radiation signal, that is, the electric charge packet and outputs the result information.

The image processor 600 may generate a radiation image based on the counting result information output from the photon counting apparatus 500. For example, according to a radiation strength corresponding to each of the pixels, the image processor 600 may substitute a predetermined image value for pixels on the radiation image corresponding to each of the pixels, and may generate the radiation image. In detail, when the number of photons counted corresponding to predetermined pixels is small or close to zero, and thus the radiation strength is low, the image processor 600 displays pixels on the radiation image corresponding to the predetermined pixels with a relatively dark color, for example, a black color. Meanwhile, when the number of photons counted corresponding to predetermined pixels is large, and thus the radiation strength is high, the image processor 600 displays pixels on the radiation image corresponding to the predetermined pixels with a relatively bright color, for example, a white color and may generate a predetermined radiation image.

The image processor 600 described above may be a processor installed in a radiographic imaging apparatus, or a processor installed in a workstation connected to the radiographic imaging apparatus through a wired or wireless communication network.

The radiation image generated in the image processor 600 may be stored in a storage medium such as a separate magnetic disk or a memory chip, or may be displayed through the display unit d of FIG. 5 installed in an external workstation.

The radiation image output from the image processor 600 may be transmitted to an image post-processing unit 610. The image post-processing unit 610 may further correct the radiation image by correcting brightness or a color, a contrast or a sharpness of the radiation image. As another example, the image post-processing unit 610 may generate a three-dimensional radiation image by using a plurality of radiation images. The post-processed radiation image may be transmitted to and stored in the storage medium, or may be transmitted to the radiographic imaging apparatus or the display unit d installed in the workstation and displayed to a user.

Figure 9:
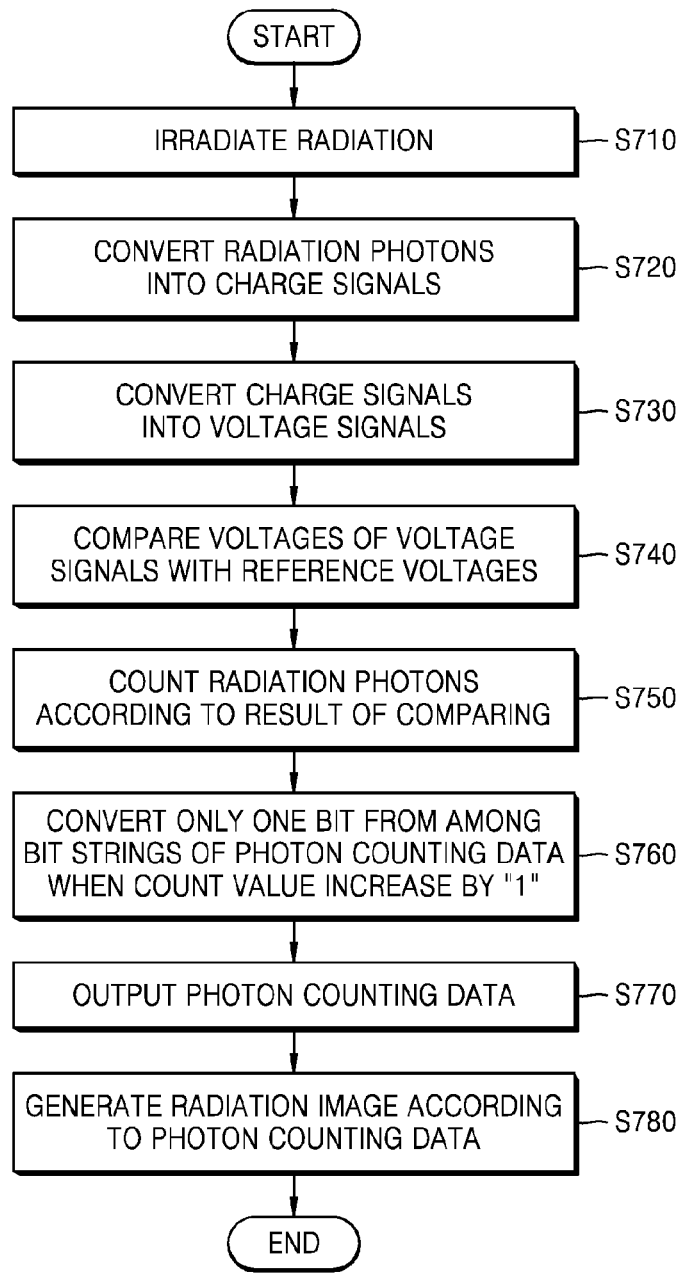
FIG. 9 is a flowchart illustrating a photon counting method according to an exemplary embodiment.

FIG. 9 is a flowchart illustrating a photon counting method of an exemplary embodiment. Referring to FIG. 9, radiation is generated and irradiated to an object ob (S710). The irradiated radiation is attenuated according to a predetermined attenuation rate while transmitting through the object ob.

The light receiving elements 421 receive the radiation attenuated according to the predetermined attenuation rate while transmitting through the object ob, as well as the radiation that directly reaches the radiation detector 400 without passing through the object ob, and convert the radiations into charge signals corresponding to the received radiation photons (S720).

The converted charge signals are converted into voltage signals by the voltage converter 520 (S730). The amplifier 121 may amplify the converted voltage signals. The amplifier 121 may output the converted voltage signals and transmit the converted voltage signals to the comparison unit 540.

The comparison unit 540 may compare voltages of the amplified voltage signals with reference voltages and output a result signal of the comparing (S740). The result signal of the comparing may be transmitted to the counting unit 560.

The counting unit 560 may count the number of photons larger than the reference voltages according to the result of the comparing (S750). Here, the counting unit 560 counts the photons by using a method of converting only one bit from among bit strings of photon counting data when a count value increases by "1", for example, a Gray code method (S760).

The counting unit 560 may output a result of the counting (S770), and the image processor 600 may generate a predetermined radiation image according to the read counting result (S780).

The photon counting methods and the photon counting apparatuses using the same according to exemplary embodiments may minimize a data-change frequency of when the data is counted by a counter in a readout circuit unit and limit current flow, and thus may stabilize a power source noise of a digital power source.

The photon counting methods and the photon counting apparatuses using the same according to exemplary embodiments may strengthen a noise characteristic and stabilize a performance.

The radiographic imaging apparatus according to exemplary embodiments may be easily applied to an apparatus requiring a high-resolution image such as a mammography apparatus or an angiography device, as strengthening noise characteristics of a photon counting apparatus.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A photon counting method, the method comprising:
   receiving a charge signal corresponding to incident radiation photons;
   counting the incident radiation photons by using a plurality of counting bits and by increasing a count value by one each time a radiation photon is incident to a radiation detector, wherein the incident radiation photons are used to generate the charge signal; and
   outputting the count value, as photon counting data, at a point in time when radiation photons are no longer being incident to the radiation detector, wherein
   the counting comprises changing only one counting bit from among the plurality of counting bits when the count value is increased by one,
   wherein the counting further comprises:
   voltage converting the charge signal into a voltage signal;
   comparing, by a plurality of comparators, a voltage of the voltage signal with each of a plurality of different reference voltages and outputting, by the plurality of comparators, results of the comparing; and
   receiving, by a plurality of counters, the results of the comparing from the plurality of comparators and counting, by the plurality of counters, the incident radiation photons based on the results of the comparing.

2. The method of claim 1, wherein the counting further comprises counting using a Gray code.

3. The method of claim 1, wherein
   the results of the comparing comprise information about determining whether or not the voltage of the voltage signal equal or exceed each of the plurality of different reference voltages, and
   the incident radiation photons are counted according to the plurality of different reference voltages.

4. The method of claim 1, wherein the voltage converting comprises:
   charging a capacitor by the charge signal; and
   amplifying a voltage applied to both ends of the capacitor.

5. The method of claim 4, further comprising:
   generating a feedback control signal based on the results of the comparing, wherein
   the voltage converting further comprises resetting the voltage applied to the capacitor in response to the feedback control signal.

6. The method of claim 1, further comprising:
   shaping the voltage signal prior to comparing the voltage of the voltage signal with each of the plurality of different reference voltages.

7. A photon counting apparatus, the apparatus comprising:
   a readout circuit configured to count incident radiation photons by using a plurality of counting bits and by increasing a count value by one each time a radiation photon is incident to a radiation detector, the incident radiation photons being used to generate a charge signal corresponding to the incident radiation photons, and configured to output the count value, as photon counting data, at a point in time when the radiation photons are no longer being incident to the radiation detector, wherein
   the readout circuit comprises a counter configured to change only one counting bit from among the plurality of counting bits when the count value is increased by one,
   wherein the readout circuit further comprises:
   a voltage converter configured to convert the charge signal into a voltage signal; and
   a comparison unit including a plurality of comparators configured to compare a voltage of the voltage signal with each of a plurality of different reference voltages and output results of the comparing,
   wherein the counter includes a plurality counters configured to receive the results of the comparing from the plurality of comparators and count the incident radiation photons based on the results of the comparing.

8. The apparatus of claim 7, wherein the counter is configured to count the incident radiation photons by using a Gray code.

9. The apparatus of claim 7, further comprising:
   a photoelectric converter configured to absorb the incident radiation photons and convert the absorbed incident radiation photons into the charge signal.

10. The apparatus of claim 7, wherein
    the results of the comparison unit comprise information about determining whether or not the voltage of the voltage signal equal or exceed each of the plurality of different reference voltages, and
    the incident radiation photons are counted according to the plurality of different reference voltages.

11. The apparatus of claim 7, wherein the voltage converter comprises:
    a capacitor configured to be charged by the charge signal and convert the charge signal into the voltage signal; and
    an amplifier connected to the capacitor.

12. The apparatus of claim 11, wherein the voltage converter further comprises:
    a feedback resistor connected to both ends of the capacitor.

13. The apparatus of claim 11, wherein the readout circuit further comprises a feedback switch control circuit configured to generate a feedback control signal based on the output result from the comparison unit, and
    the voltage converter further comprises a switch to reset a voltage applied to the capacitor in response to the feedback control signal.

14. The apparatus of claim 11, further comprising:
    a shaper configured to shape the voltage signal converted by the voltage converter.

15. A radiation imaging apparatus, the apparatus comprising:
    a radiation irradiator configured to emit photon radiation towards a radiation detector, the radiation detector configured to receive the photon radiation and convert the photon radiation into an electrical signal;
    a photon counter configured to receive the electrical signal, count the number of photons received by the radiation detector in the photon radiation using a Gray code, and output a counting result corresponding to the number of photons received by the radiation detector in the photon radiation;

an image processor configured to generate a radiation image based on the counting result output from the photon counter; and a display configured to display the radiation image generated by the image processor, wherein the photon counter comprises a plurality of counting bits such that when a single photon is received by the radiation detector, only a single counting bit from among the plurality of counting bits is changed, wherein the photon counter comprises:

a voltage converter configured to convert the electrical signal into a voltage signal;

a comparison unit including a plurality of comparators configured to compare a voltage of the voltage signal with each of a plurality of different reference voltages and output results of the comparing; and a plurality of counters configured to receive the results of the comparing from the plurality of comparators and count the photons based on the results of the comparing.

16. The radiation imaging apparatus according to claim 15, wherein the photon counter is further configured such that an output result of each of the plurality of comparators comprises information about whether or not the voltage of the voltage signal equal or exceed a reference voltage of the plurality of different reference voltages, and the photons received by the radiation detector are counted according to the plurality of different reference voltages.

* * * * *